United States Patent
Hellgren et al.

(10) Patent No.: US 11,462,114 B2
(45) Date of Patent: Oct. 4, 2022

(54) METHOD FOR CONTROLLING VEHICLES IN A MISSION ALONG A ROUTE

(71) Applicant: VOLVO TRUCK CORPORATION, Gothenburg (SE)

(72) Inventors: Jonas Hellgren, Gothenburg (SE); Mohammad Manjurul Islam, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/593,571

(22) PCT Filed: Mar. 22, 2019

(86) PCT No.: PCT/EP2019/057316
§ 371 (c)(1),
(2) Date: Sep. 21, 2021

(87) PCT Pub. No.: WO2020/192875
PCT Pub. Date: Oct. 1, 2020

(65) Prior Publication Data
US 2022/0122463 A1    Apr. 21, 2022

(51) Int. Cl.
*G05D 1/02*    (2020.01)
*G08G 1/01*    (2006.01)
(Continued)

(52) U.S. Cl.
CPC .............. *G08G 1/22* (2013.01); *G05D 1/0223* (2013.01); *G05D 1/0293* (2013.01);
(Continued)

(58) Field of Classification Search
CPC ...... G07C 5/02; G08G 1/0125; G08G 1/0137; G08G 1/01; G08G 1/0145; G08G 1/056
See application file for complete search history.

(56) References Cited

U.S. PATENT DOCUMENTS 6,246,932 B1    6/2001 Kageyama et al.
2014/0197967 A1    7/2014 Modica et al.
(Continued)

OTHER PUBLICATIONS

International Search Report and Written Opinion dated Nov. 29, 2019 in corresponding International PCT Application No. PCT/EP2019/057316, 10 pages.
(Continued)

*Primary Examiner* — Alan D Hutchinson
*Assistant Examiner* — Andy Schneider
(74) *Attorney, Agent, or Firm* — Venable LLP; Jeffri A. Kaminski

(57) ABSTRACT

The invention relates to a method for controlling vehicles (V1-V3) in a mission along a route, comprising—selecting at least two progress control value sets (u, tw), each value set comprising a respective value (u1, u2, u3, tw) of a progress control parameter for at least one of the vehicles, wherein each progress control parameter value influences the rate of progress of the respective vehicle, —determining, for each of the selected progress control value sets, a respective distribution (SoBfut) of the vehicles, if the at least one of the vehicles is controlled based on the respective selected progress control value set (u, tw), so that each progress control value set is correlated to a respective distribution (SoBfut) of the vehicles, —identifying, from the selected progress control value sets, based at least partly on the determinations of the distributions (SOBfut), a progress control value set (u, tw) for controlling the at least one of the vehicles, and—controlling the at least one of the vehicles (V1-V3) according to the identified progress control value set (u).

17 Claims, 7 Drawing Sheets

(51) Int. Cl.
*G08G 1/00* (2006.01)
*H04W 4/46* (2018.01)

(52) U.S. Cl.
CPC ............. *G08G 1/0145* (2013.01); *G08G 1/20* (2013.01); *H04W 4/46* (2018.02); *G05D 2201/0213* (2013.01)

(56) References Cited

U.S. PATENT DOCUMENTS

| | | |
|---|---|---|
| 2015/0046073 A1 | 2/2015 | Saloner et al. |
| 2017/0205814 A1 | 7/2017 | Marsolek |
| 2021/0158693 A1* | 5/2021 | Sze ...................... G08G 1/0116 |

OTHER PUBLICATIONS

International Preliminary Report on Patentability dated Oct. 5, 2020 in corresponding International PCT Application No. PCT/EP2019/057316, 13 pages.

* cited by examiner

METHOD FOR CONTROLLING VEHICLES IN A MISSION ALONG A ROUTE

CROSS-REFERENCE TO RELATED APPLICATIONS

This application is a U.S. National Stage application of PCT/EP2019/057316, filed Mar. 22, 2019, and published on Oct. 1, 2020, as WO 2020/192875 A1, all of which is hereby incorporated by reference in its entirety.

TECHNICAL FIELD

The invention relates to a method for controlling vehicles in a mission along a route. The invention also relates to a computer program, a computer readable medium, a control unit and a vehicle.

The invention can be applied to heavy-duty vehicles, such as trucks and buses. Although the invention will be described with respect to trucks, the invention is not restricted to this particular type of vehicle, but may also be used in other vehicle types such as delivery vans and cars.

BACKGROUND

A plurality of vehicles may be arranged to undertake a mission along a route. A common setup for a heavy vehicle fleet is a circulating mission. A problem which may occur thereby is that, with time, an imbalance may occur with regards to the gaps between the vehicles. This can in turn create further problems, such as a queue at a fueling station, or charging station for the vehicles. This may reduce the productivity of the vehicle fleet.

US2017205814 describes managing transport of a material between two locations, during a road building process. The document mentions ascertaining a relative timing between certain transport vehicles, and directing the control of one or more vehicles to ensure proper spacing between vehicles.

However, in a vehicle fleet in a mission, a problem that has to be addressed is that a control action to fix a gap between two vehicles being different from what is desired, may lead to the divergence of another gap in the fleet, from what is desired, being increased. For example, if the speed of a first vehicle is increased to increase the gap to a second vehicle behind the first vehicle, the gap between the first vehicle and a third vehicle in front of the first vehicle may become too small.

SUMMARY

An object of the invention is to reduce losses of productivity of vehicles in a mission along a route. Another object of the invention is to provide a method to obtain, or secure, desired gaps between vehicles in a mission along a route.

The objects are reached with a method according to claim 1. Thus, the invention provides a method for controlling vehicles in a mission along a route, said method comprising:
  selecting at least two progress control value sets, each value set comprising a respective value of a progress control parameter for at least one of the vehicles, wherein each progress control parameter value influences the rate of progress of the respective vehicle,
  determining, for each of the selected progress control value sets, a respective distribution of the vehicles, if the at least one of the vehicles is controlled based on the respective selected progress control value set, so that each progress control value set is correlated to a respective distribution of the vehicles,
  identifying, from the selected progress control value sets, based at least partly on the determinations of the distributions, a progress control value set for controlling the at least one of the vehicles, and
  controlling the at least one of the vehicles according to the identified progress control value set.

The method may comprise controlling, before any of said method steps, all vehicles to drive along the route. By the vehicles being in a mission along a route, the vehicles may be said to perform a mission along the route. Thereby, the vehicles may have the same duty, or similar duties. Such a duty may involve driving along the route, from a start position, to an end position. The duty may also involve stopping at one or more locations along the route, for actions, such as loading, or unloading. Fuelling, or charging, may also be included in the duty. Where the end position is the same as the start position, the mission can be said to be a circulating mission. The vehicles may be allowed to start from the start position, separated in time. This separation may follow a predetermined schedule. The separation may include predetermined time intervals between the vehicle starts. The start time interval may be the same between each of two sequential vehicle starts.

It should be noted that since each progress control value set comprises a respective value of a progress control parameter for at least one of the vehicles, there is at least one value in each value set. As exemplified below, in some embodiments, the sets may comprise only one value. Further, in such embodiments, each value set may comprise a respective value of a progress control parameter for only one of the vehicles.

Each progress control parameter value is related to the rate of progress of the respective vehicle, by influencing the rate of progress of the respective vehicle.

As exemplified below, in some embodiments, in each progress control value set, each progress control parameter value represents a time interval value for a standstill condition of the respective vehicle. Thereby, one or more of the time intervals may be zero. Thus, herein, also a zero standstill time interval is regarded as a progress control parameter value which influences the rate of progress of the respective vehicle.

In the method, a plurality of progress control value sets may be selected. The selected progress control value sets may be different from each other. Each progress control value set may be different from any other of the progress control value sets. Each progress control value set may be correlated to a respective distribution of the vehicles.

The method may involve determining the positions of the vehicles along the route. Thereby, determining a respective distribution of the vehicles, may be dependent on the determined positions of the vehicles. In some embodiments, the method may involve determining speeds of the vehicles. In some embodiments, the method may involve determining time gaps between the vehicles along the route. Thereby, determining a respective distribution of the vehicles, may be dependent on the determined time gaps.

Identifying a progress control value set for controlling the at least one of the vehicles, may involve comparing the distributions, to which the progress control value sets are correlated, and identifying, from the selected progress control value sets, based at least partly on the comparison of the distributions, a progress control value set for controlling the at least one of the vehicles. Comparing the distributions, to which the progress control value sets are correlated, may comprise comparing the distributions to a reference distribution, or a desired distribution. Comparing the distributions may involve comparing the distributions to each other. Comparing the distributions to each other may comprise comparing the distributions to a reference distribution, or a desired distribution.

The method provides a holistic approach to the vehicle distribution imbalance problem, allowing it to be solved for the entire fleet at once. Also, the invention allows for obtaining desired gaps between vehicles in a mission along a route, even where there is a relatively large number of vehicles. Thus, the invention provides an effective method for obtaining a desired spacing between the vehicles in a mission along a route. Thereby, queuing of the vehicles can be avoided, whereby losses of productivity of vehicles are reduced. It should be noted that herein, a gap between two vehicles may be, depending on the embodiment, a time gap, or a spatial gap. A spatial gap may be a distance along the route.

Preferably, at least one of the determined distributions is at a future point in time. Thus, determining a respective distribution of the vehicles, may comprise determining, for each of the selected progress control value sets, a respective distribution of the vehicles, at least one of the distributions being at a future point in time. Thereby, at least one of the progress control variable sets may be correlated to a respective distribution of the vehicles, at the future point in time. As mentioned, and as exemplified below, in some embodiments, in each progress control value set, each progress control parameter value represents a time interval value for a standstill condition of the respective vehicle, and thereby, one or more of the time intervals may be zero. Thereby, determining a respective distribution of the vehicles, may comprise determining, for any of the selected progress control value sets comprising a progress control parameter value representing a zero standstill time interval, a respective distribution of the vehicles at a present point in time.

Preferably, determining a respective distribution of the vehicles comprises determining a distribution of the vehicles, if the at least one of the vehicles is controlled based on at least one of the selected progress control value sets, from a first point in time to the future point in time. Thereby, the distributions of the vehicles, each obtained from a respective selected progress control value set, may be calculated based on the same time interval, and readily compared to each other. Thus, determining a respective distribution of the vehicles may involve a respective simulation of vehicle movements from the first point in time to the future point in time. It should be noted however that in some embodiments, as exemplified below, the time interval from the first point in time to the future point in time may be different from one vehicle distribution determination to another. Also, one or more of the vehicle distribution determinations may involve a zero time interval from the first point in time to the future point in time, e.g. where there is a zero standstill time interval, as exemplified above.

Preferably, selecting at least two progress control value sets, and determining, for each of the selected progress control value sets, a respective distribution of the vehicles, comprises selecting a progress control value set, determining a distribution of the vehicles, if the at least one of the vehicles is controlled based on the selected progress control value set, and repeating at least once the progress control value set selection and the vehicle distribution determination. Preferably, when repeating the progress control value set selection and the vehicle distribution determination, a selection of a different progress control value set is made in the progress control value set selection.

Thereby, by the repetition, a single computation unit may be used for the selection of the progress control value sets, and the determination of the respective vehicle distribution. However, in some embodiments, a plurality of progress control value sets may be selected in parallel processes. Also, in some embodiments, the vehicle distribution determination, for each of the selected progress control value sets, may be done in parallel processes.

Repeating the progress control value set selection and the vehicle distribution determination preferably comprises repeating the progress control value set selection and the vehicle distribution determination a plurality of times. The progress control value set selection and the vehicle distribution determination may be repeated a predefined number of times. Preferably, each repetition is made with a new selection of a progress control value set. Such a new selection may involve one or more changes of the at least one value of the progress control value set.

In some embodiments, the progress control value sets are speed value sets, each speed value set comprising a respective speed value for at least one, preferably more than one, of the vehicles. Thereby, a plurality of speed value sets may be obtained. The selected speed value sets may be different from each other. Each speed value set may be different from any other of the speed value sets. Determining a respective distribution of the vehicles, may comprise determining, for each of the selected speed value sets, a respective distribution of the vehicles, at least one, preferably all, of the distributions being at a future point in time. Thereby, each speed value set may be correlated to a respective distribution of the vehicles, at the future point in time. Thereby, a holistic approach to the vehicle distribution imbalance problem is provided, allowing it to be solved for the entire fleet at once.

Preferably, each speed value set comprises a respective speed value for all of the vehicles. Thereby, an effective control of the entire fleet may be facilitated.

Preferably, one, some, or all, of the speed values of the each speed value set, is a speed change value. Thereby, a change of a reference target speed of one or more of the vehicles may be selected. Such a reference target speed may be dependent on the position along the route. Hence, the reference target speeds, adjusted with the speed value sets, may also depend on the position. Thus, during the determination of the respective distribution, the speeds of one or more of the vehicles, from the first point in time to the future point in time, may vary.

In some embodiments, one, some, or all, of the speed values of the respective speed value set, is an absolute speed value. Such an absolute value may be different from a respective reference target speed, or represent a changed reference target speed. In some embodiments, each speed value set is a control vector indicating, for each vehicle, a condition with no speed change, a condition with a positive speed change, or a condition with a negative speed change. Such a control vector may be multiplied with a unit speed change value. The unit speed change value may be predetermined. As exemplified below, the unit speed change value may be dependent on the position along the route. Thereby, a simple, "almost binary", speed value set may be provided. The separation of the unit speed value from the control vector, makes adjustments of embodiments of the vehicle control method easy.

As suggested, the method may involve determining a respective reference target speed for each of the vehicles. The respective reference target speed may depend on the position along the route. The reference target speeds may be the same for all vehicles, at any given position along the route. The identified speed value set, according to which the speeds of the vehicles are controlled, may form, or be used to form, adjusted reference target speeds for the vehicles. In some embodiments however, the reference target speed may be independent of the position along the route.

The speed values in the selected speed value sets may be dependent on the respective positions of the vehicles along the route. In some embodiments however, the speed values in the selected speed value sets may be independent on the respective positions of the vehicles along the route.

Where one, some, or all, of the speed values of the respective speed value set, is a speed change value, the respective speed change value may depend on the position of the respective vehicle, e.g. at a time of the selections of the speed value set. However, even if the respective speed change value may depend on the position of the respective vehicle, at a time of the selections of the speed value sets, the speed change values may remain constant throughout the simulations for determining the respective future distribution of the vehicles. Nevertheless, in some embodiments, the speed change values may change, during the simulations, in dependence on the vehicle positions.

In some embodiments, in each progress control value set, each progress control parameter value represents a time interval value for a standstill condition of the respective vehicle. Thereby, each progress control value set may indicate whether the at least one vehicle will enter a time limited standstill condition. Such a standstill condition may be effected by the vehicle waiting for a predetermined time period. Such waiting may be done in a designated waiting area along the route.

In some embodiments, progress control value sets are selected for only one of the vehicles. Thereby, each progress control value set may comprise only one value. Thus, in such embodiments, a method may be provided for controlling vehicles in a mission along a route, the method comprising
  selecting at least two values of a progress control parameter for one of the vehicles, wherein each progress control parameter value influences the rate of progress of said vehicle,
  determining, for each of the selected progress control parameter values, a respective distribution of the vehicles, if said vehicle is controlled based on the respective selected progress control parameter value, so that each progress control parameter value is correlated to a respective distribution of the vehicles,
  identifying, from the selected values, based at least partly on the determinations of the distributions, a progress control parameter value for controlling said vehicle, and
  controlling the said vehicle according to the identified progress control parameter value.

The method may be carried out upon one of the at least one vehicle approaching a designated waiting area along the route. The vehicle may then be controlled according to the identified progress control parameter value. Such control may involve stopping and waiting in the waiting area for a specified amount of time. Depending on the identified progress control parameter value, e.g. where the identified progress control parameter value represents a zero standstill time interval, such control may involve passing the waiting area without stopping.

One of the progress control value sets may include a progress control parameter value representing a zero standstill time interval of the respective vehicle, i.e. no standstill, and the remaining at least one progress control value set may each include a progress control parameter value representing a standstill condition during a respective predetermined time interval. In some embodiments, three or more progress control value sets are selected, wherein, in the remaining at least two progress control value sets, the time intervals are different from one progress control value set to another. Thus, there may be a progress control value set selected with only one value representing a zero waiting time, and there may be a plurality of additional progress control value sets selected, each with only one value representing a respective positive waiting time, wherein the waiting times are different from each other. In some embodiments, only two progress control value sets are selected, each having only one value. Thereby, one of the values may represent a standstill condition during a predetermined time interval, and the other value may represent a zero standstill time interval, i.e. no standstill condition. In further embodiments, more than two progress control value sets are selected, each having only one value. Thereby, one of the values may represent no standstill condition, and the remaining values may represent a standstill condition during a respective predetermined time interval, wherein the time intervals are different from each other.

Preferably, identifying a progress control value set for controlling at least one of the vehicles, comprises identifying, from the selected progress control value sets, a progress control value set based partly the respective standstill time interval for the at least one vehicle. Thereby, consideration may be made, not only to the object to obtain a desired distribution of the vehicles, but also to keeping a loss of productivity, due to the vehicle standstill condition, low. I.e. a balance may be obtained between moving towards the desired distribution of the vehicles, and minimising the loss of productivity, due to the vehicle standstill condition.

Preferably, the method comprises determining a desired distribution of the vehicles along the route. The desired distribution may be a desired spatial distribution along the route, and/or a desired time distribution. In some embodiments, identifying a progress control value set for controlling the at least one of the vehicles, comprises identifying a distribution of the vehicles, which presents the smallest deviation from the desired distribution, and identifying the progress control value set which is correlated to the identified distribution which presents the smallest deviation from the desired distribution. The desired distribution of the vehicles may be a distribution where the gaps, e.g. the time gaps and/or spatial gaps, between the vehicles are equal. In some embodiments, however, the desired distribution of the vehicles may be a distribution where some, or all, of the gaps between the vehicles are unequal. Thereby, determining a respective distribution of the vehicles preferably comprises determining a respective deviation of the vehicles, from the desired distribution. Preferably, determining a respective distribution of the vehicles comprises determining a respective state of balance indicating, as a function of the respective speed value set, a respective deviation of the vehicles, from the desired distribution. As suggested, at least one or more of the distributions may be at a future point in time. For such distributions, the determined respective state of balance may be referred to as a future state of balance. For example, determining the respective future state of balance may comprise determining a respective distribution of the vehicles along the route, at the future point in time, and comparing the determined vehicle distribution to the desired distribution. Preferably, determining a respective state of balance comprises calculating a respective value of the state of balance, and identifying a progress control value set for controlling the at least one of the vehicles, comprises identifying the state of balance value which represents the smallest deviation from a distribution where the gaps between the vehicles are equal. As stated, a gap between two vehicles may be a time gap, or a spatial gap.

Thus, the state of balance is a parameter that makes it easy to compare the results of the selected speed value sets. For example, the comparison may simply involve calculating the minimum value of the state of balance. The state of balance can be calculated in a variety of ways, e.g. as a standard deviation of vehicle gaps in the vehicle fleet, or a difference between the maximum vehicle gap and the minimum vehicle gap in the vehicle fleet. As a further alternative, the state of balance could be calculated as the minimum gap between the vehicles.

Where each progress control value set, each progress control parameter value represents a time interval value for a standstill condition of the respective vehicle, identifying a progress control value set for controlling at least one of the vehicles, may comprise identifying a progress control value set which minimises a function which is dependent on the deviation from the desired distribution, and the standstill time. By minimising said function, a particularly effective way of providing a balance between moving towards the desired distribution of the vehicles, and minimising the loss of productivity, due to the vehicle standstill condition, may be accomplished.

In some embodiments, the mission is a circulating mission. Thereby, the advantages of the invention will be particularly salient. A circulating mission may be such that the vehicles do not pass the same location twice when driving from a start position to an end position. However, a circulating mission may also involve driving on the same road, or street, twice, e.g. in opposite directions, when driving from the start position to the end position. In some embodiments, the mission may be non-circular, i.e. a mission from a start position to an end position which is different from the start location.

Preferably, the method comprises repeating after a predetermined time interval the steps of selecting progress control value sets, determining a respective vehicle distribution, identifying a progress control value set for controlling the at least one of the vehicles, and controlling the at least one of the vehicles according to the identified progress control value set. Thereby, deviations from a desired distribution of vehicles, may be repetitively corrected.

The objects are also reached with a computer program, a computer readable medium, a control unit or a group of control units, or a vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
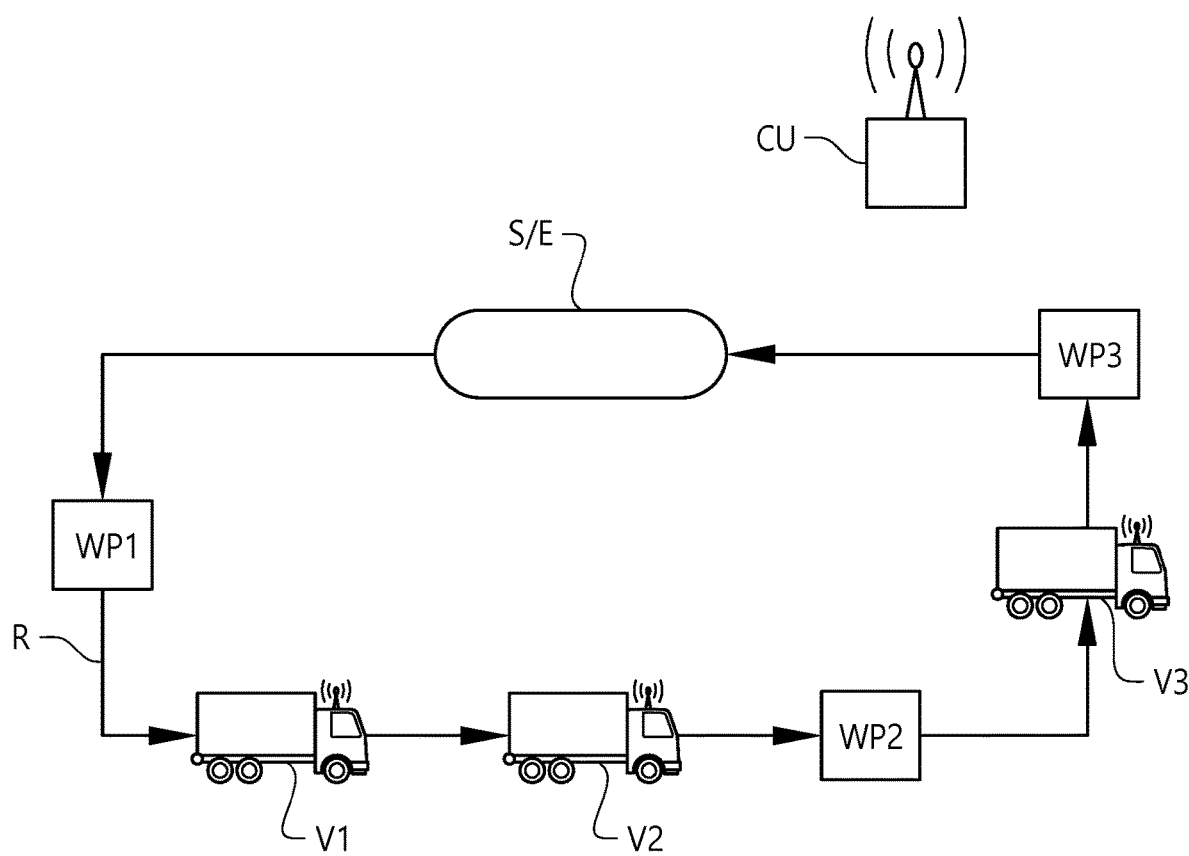
FIG. 1 is a schematic view of three vehicles in a circulating mission.

FIG. 1 depicts schematically a fleet of heavy-duty vehicles V1, V2, V3 in a circulating mission. In this example, the vehicles are in the form of trucks. However, the vehicles may be of any type suitable for the particular mission. For example, the vehicles may be delivery vans, buses, mining trucks, or cars. In this example, there are three vehicles in the fleet, but there could in principle be any number of vehicles in the fleet.

The circulating mission involves driving on a route R, from a start and end position S/E, to one or more action positions, in this example three action positions wp1, wp2, wp3, herein also referred to as waypoints, at separate locations, and then back to the start and end position S/E. The route could be in any type of environment, such as urban, rural, or mining. A movement of a vehicle from the start and end position S/E, via the action positions wp1, wp2, wp3, and back to the start and end position S/E, is herein referred to as a cycle.

The mission could involve one or more activities at each of the action positions wp1-wp3, for example delivery or pick-up of goods or people. It is understood that the mission could involve any number of action positions. The mission could also involve one or more activities at the start and end position S/E, for example fuelling and/or charging of batteries of the vehicles.

In alternative embodiments, the mission could be, as opposed to circulating, extend from a start position to an end position at a location which is different from that of the start position.

A control unit CU is arranged to carry out steps of an embodiment of a method according to the invention. The control unit could be a part of a control center for controlling the vehicle fleet. The control unit CU is arranged to communicate wirelessly with each of the vehicles V1-V3.

The control unit CU may be arranged to receive information from the vehicles, e.g. regarding their positions, and speeds. The control unit may also be arranged to send control commands to the vehicles. In some embodiments, the vehicles are driverless, and control devices (not shown) in the vehicles, which are arranged to control operational devices of the vehicles, such as engines, motors, brakes and steering, may be arranged to read the control commands from the control unit CU. In other embodiments, the vehicles may be arranged to display control commands from the control unit CU, to drivers of the vehicles.

In some embodiments, the control unit CU could be located on one of the vehicles, or parts of the control unit CU could be distributed on a plurality of the vehicles.

It is understood that the control unit CU comprise a computer. It is further understood that the control unit CU may be arranged to carry out an embodiment of the method according to the invention, by means of a computer program.

The distribution of vehicles along the route R is herein also referred to a state of balance SoB of the vehicles. The state of balance could be defined as the difference between the maximum gap between two successive vehicles and the minimum gap between two successive vehicles. I.e.

$$SoB(t)=\max(\text{gap}(t))-\min(\text{gap}(t)) \quad (1)$$

Preferably, the gaps are time gaps. However, it is alternatively possible that the gaps are spatial gaps, e.g. distances along the route R.

Figure 2:
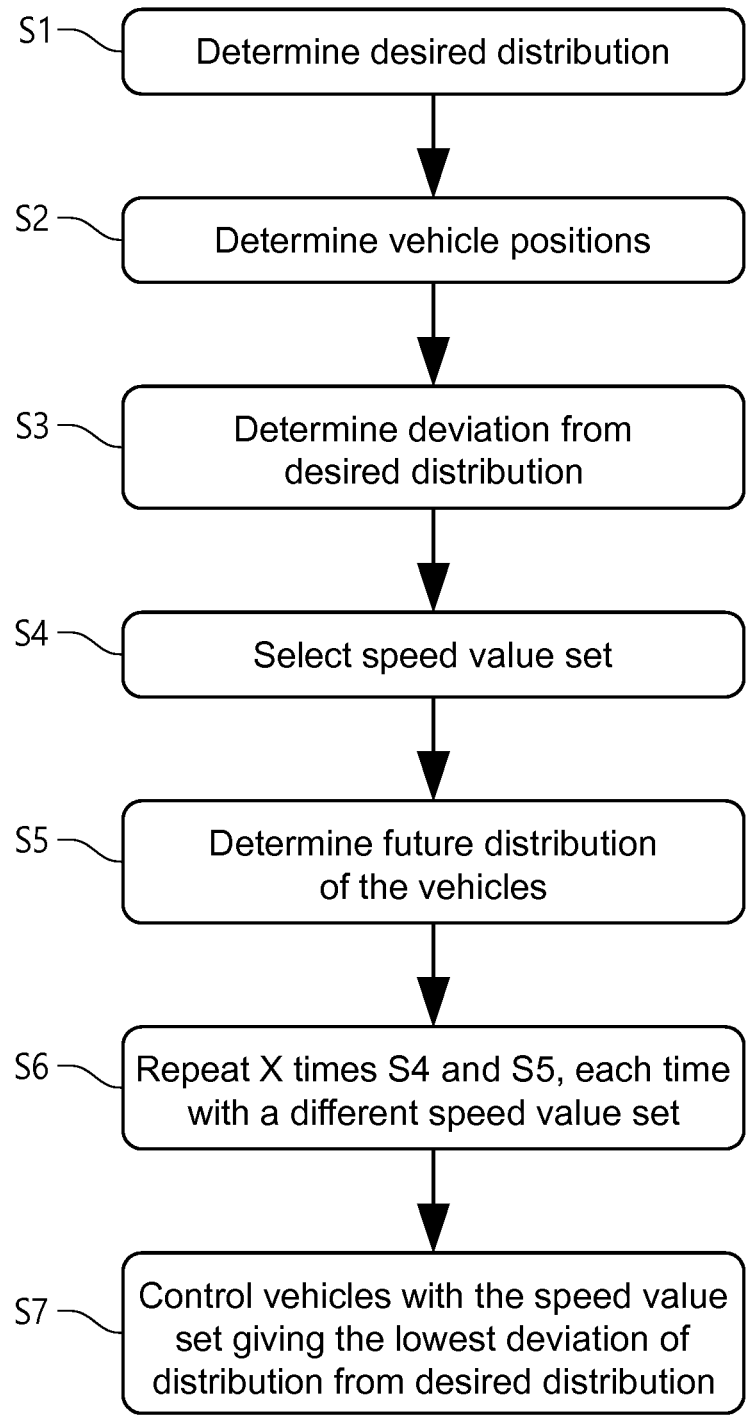
FIG. 2 is a diagram depicting steps in a method according to an embodiment of the invention.

Reference is made also to FIG. 2. Embodiments of a method according to the invention comprises determining S1 a desired distribution of the vehicles along the route R. In embodiments, the desired distribution is a distribution where the gaps between the vehicles are equal.

The positions $pos_i(t)$ of the vehicles along the route R are determined S2. The speeds of the vehicles may be determined, or set, as reference target speeds vref. The reference target speeds may be predetermined. The respective reference target speed may depend on the position along the route. The reference target speeds may be the same for all vehicles, for any given position along the route. Thus, at any give moment in time, the reference target speed may be different from one vehicle to another.

From the determined vehicle positions $pos_i(t)$, a deviation from the desired vehicle distribution is established S3. In other words, the state of balance SoB(t) is determined with equation (1) above. In the example in FIG. 1, the gap between two of the vehicles V1, V2 is too small, and this gap is the minimum gap in equation (1).

As a first step to reduce the deviation from the desired vehicle distribution, a progress control value set in the form of a speed value set u is selected S4. The speed value set comprises a respective speed value for a plurality of the vehicles, preferably for all of the vehicles. Thus, the respective speed value influences the rate of progress of the respective vehicle. At least one, or some, of the speed value is a speed change value, or an absolute speed value, which is different from the determined or set speed, e.g. the reference target speed vref, of the respective vehicle. In this example, the speed value set is a control vector u indicating, for each vehicle V1-V3, a condition with no speed change 0, a condition with a positive speed change 1, or a condition with a negative speed change −1.

A position of the respective vehicle, as a result of the respective speed change given by the respective speed value of the speed value set u, can be expressed as $$pos_i(t_{fut})=pos_i(t)+dt\cdot(v_{ref}(t)+\varepsilon_i) \quad (2)$$

where $v_{ref}$ is the reference target speed for the vehicle. In this example, the reference target speed is the same for all vehicles, for any given position along the route R. The term $\varepsilon_i$ is the speed change given by multiplying the respective speed value $u_i$ of the speed value set, with a unit speed change value $dv_{max}$. The unit speed change value $dv_{max}$ may be predetermined. It should be noted that the unit speed change value may depend on the position along the route. The unit speed change value $dv_{max}$ may be a maximum allowed change of the reference target speed $v^{ref}$. The speed change $\varepsilon_i$ may be seen as a "disturbance" speed deviation. The purpose of the speed change $\varepsilon_i$ is to reduce the gap imbalance SoB. Where the future state of balance is calculated as the minimum gap between the vehicles, reducing the gap imbalance may involve increasing the minimum gap. Thus, a speed change vector may be determined as $$\varepsilon=dv_{max}\cdot u \quad (3)$$

where each value u1, u2, u3 in u is either −1, 0, or 1.

Based on the positions $pos_i(t)$ of the vehicles, a distribution SoBfut of the vehicles, at a future point in time t+dt, if the vehicles are controlled based on the selected speed value set u, is determined S5. This may be done as follows:

$$SoB_{fut}=SoB(t_{fut})=\max(\text{gap}(t_{fut}))-\min(\text{gap}(t_{fut})) \quad (4)$$

where $$\text{gap}_i(t+dt)=|pos_{i+1}(t_{fut})-pos_i(t_{fut})| \quad (5)$$

$$t_{fut}=t+dt \quad (6)$$

Thus, determining a distribution SoBfut of the vehicles V1-V3, may comprise determining the distribution of the vehicles, if the plurality of the vehicles is controlled based on the selected speed value set u, from a first point in time t to the future point in time t+dt. Thereby a deviation of the vehicles, at the future point in time t+dt, from the desired distribution may be determined.

Figure 3:
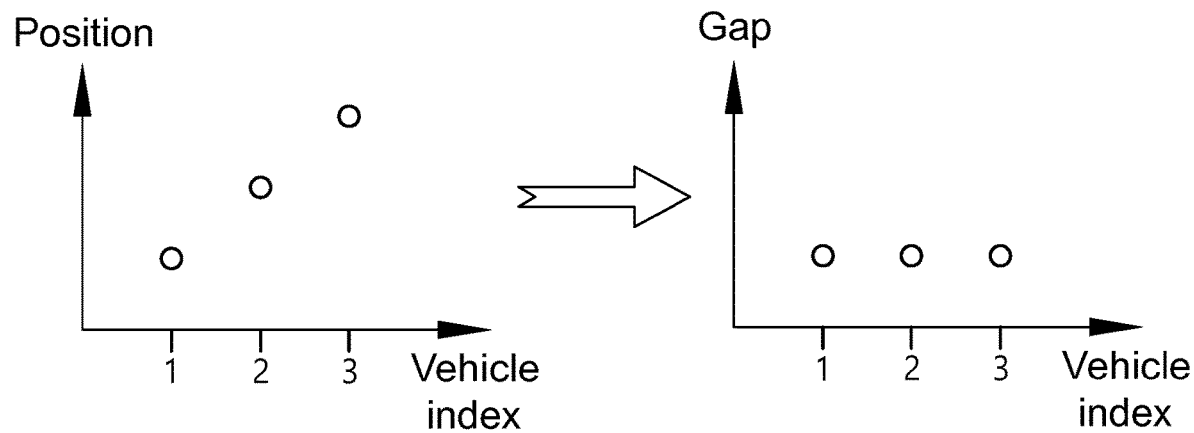
FIG. 3 shows two pairs of diagrams, each depicting vehicle positions and gaps between vehicles in FIG. 1.
Figure 3:
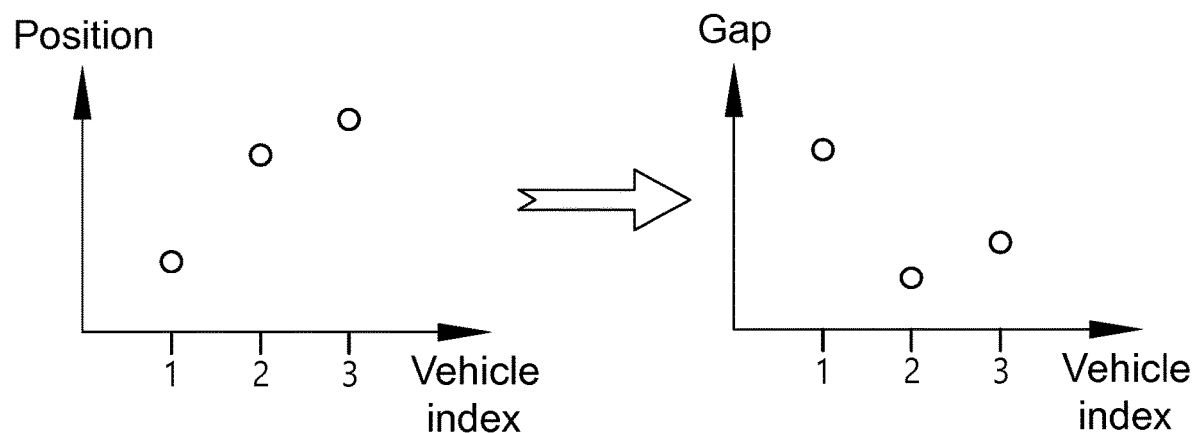

FIG. 3 shows, in the two upper diagrams, an example in which the vehicles are evenly positioned. The consequence is equal gaps and a low, or zero, state of balance SoB. In the example in the two lower diagrams, the gaps are not even distributed, the results is a relatively high value of the state of balance SOB. The method evaluates the future consequence of a control action using the speed value set U.

The steps of selecting S4 a speed value set u, and determining a future distribution SoBfut of the vehicles, with the selected speed value set, is repeated S6 a plurality of times X. At each repetition, a selection of a different speed value set u is made, resulting in a different future distribution SoBfut. The number X of repetitions may be predetermined.

Thereby, a plurality of speed value sets u is obtained, each correlated to a respective distribution SoBfut of the vehicles, at the future point in time t+dt. The future distributions SoBfut, to which the speed value sets u are correlated, are compared to each other. The future state of balance value minSoBfut which represents the smallest deviation from a distribution where the gaps between the vehicles are equal, is identified. This is the future state of balance which has the lowest value at the calculation according to expression (4) above. The speed value set u which is correlated to the future state of balance value minSoBfut, which represents the smallest deviation from a distribution where the gaps between the vehicles are equal, is identified for controlling the speeds of the vehicles. The speeds of the vehicles V1-V3 are then controlled S7 according to the identified speed value set u.

In the example described above there is a finite number of possible combinations for the speed value set u. In the initial speed value set selection S4, and in each repetition S6 of selecting a speed value set u, one of these combinations could be selected. The repetition S6 could be terminated when all combinations have been used for a respective state of balance SoB determination. In alternative embodiments, the speed value set u could be selected randomly in the initial speed value set selection S4, and at each repetition.

The method for identifying a speed value set u for controlling the vehicles, to reduce the distribution imbalance, may be repeated within suitable time intervals, which may be predetermined, such as every 1-10 minute.

The example above comprises repeating the speed value set selection and the vehicle distribution determination. However, in some embodiments, a plurality of speed value sets may be selected in parallel processes. Also, in some embodiments, the future vehicle distribution determination, for each of the selected speed value sets, may be done in parallel processes.

Figure 4:
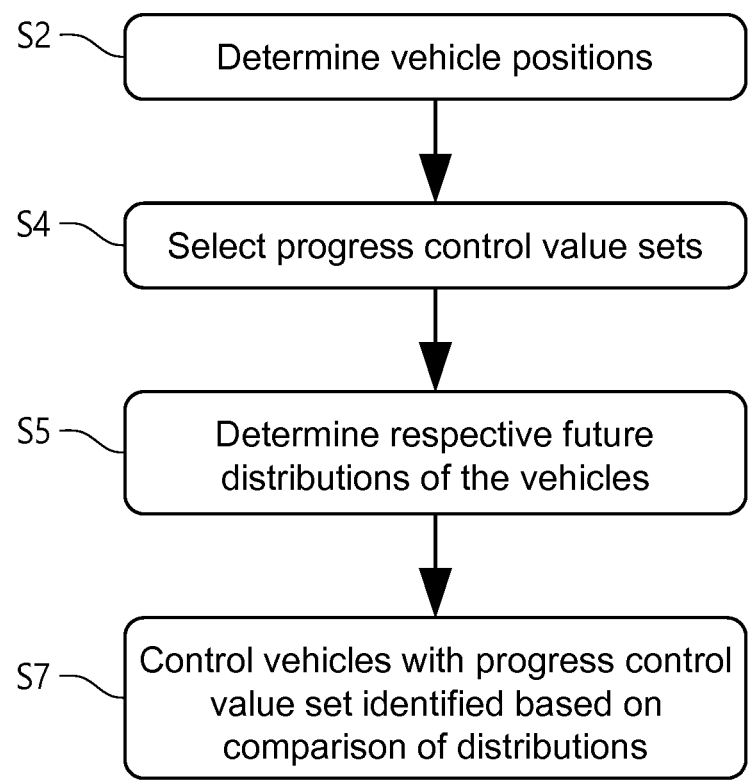
FIG. 4 is a diagram depicting steps in a method according to a general embodiment of the invention.

Referring to FIG. 4, a general embodiment of the invention will be described. A method for controlling vehicles V1-V3 (FIG. 1) in a mission along a route, comprises the following steps. The positions of the vehicles along the route are determined S2. A plurality of progress control variable sets is selected S4, each progress control variable set comprising a respective progress control variable value related to the rate of progress of a respective of a plurality of the vehicles, wherein the selected progress control variable sets are different from each other. The method further comprises determining S5, for each of the selected progress control variable sets, and based on the determined positions of the vehicles, a respective distribution of the vehicles, at a future point in time, if the plurality of the vehicles is controlled based on the respective selected progress control variable set, so as to obtain a plurality of progress control variable sets, each correlated to a respective distribution of the vehicles, at the future point in time. It should be noted that the step S4 of selecting progress control variable sets does not necessarily have to be finalized, before the step S5 of determining, for each of the selected progress control variable sets, a respective distribution of the vehicles, is commenced. The distributions, to which the progress control variable sets are correlated, are compared, and the progresses of the vehicles are controlled S7 according to a progress control variable set identified based on the comparison.

Figure 5:
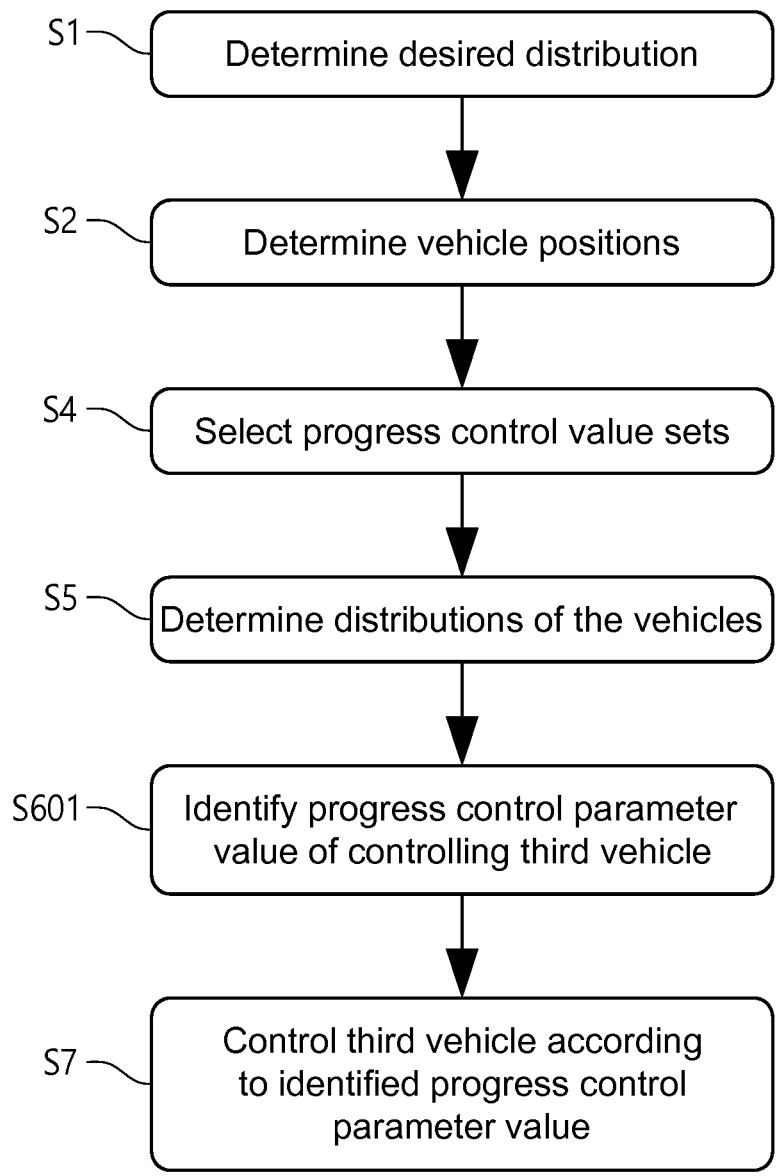
FIG. 5 is a diagram depicting steps in a method according to an alternative embodiment of the invention.

Reference is made to FIG. 5. In a further embodiment of the invention, the context is similar to that of the embodiment described with reference to FIG. 1-FIG. 3. Thus, as depicted in FIG. 1, a fleet of heavy-duty vehicles V1, V2, V3 are in a circulating mission, involving driving on a route R, from a start and end position S/E, to three action positions wp1, wp2, wp3, and then back to the start and end position S/E. A control unit CU, arranged to communicate wirelessly with each of the vehicles V1-V3, is arranged to carry out steps of a method according to the further embodiment of the invention. The control unit CU is arranged to receive information from the vehicles, e.g. regarding their positions, and speeds, and the control unit is arranged to send control commands to the vehicles.

Similar to the embodiment in FIG. 1-FIG. 3, the state of balance SoB(t), i.e. the deviation from the desired vehicle distribution, is defined as the difference between the maximum gap between two successive vehicles and the minimum gap between two successive vehicles, i.e. as expressed by equation (1) above. Preferably, the gaps are time gaps.

As can be seen in FIG. 5, the method comprises determining S1 a desired distribution of the vehicles along the route R, i.e. a distribution where the gaps between the vehicles are equal. Further, the positions posi(t) of the vehicles along the route R are determined S2.

As depicted in FIG. 1, a third of the vehicles V3 is approaching a third of the action positions wp3. The third action position includes a waiting area. Thereupon, the following steps are performed:

A plurality of progress control variable sets are selected S4. In this embodiment, each progress control value set, comprises only one value, herein referred to as a progress control parameter value. The progress control parameter value represents, or is, a time interval value $t_w$ for a standstill condition of the third vehicle V3. Thereby, the progress control value set indicates whether the third vehicle V3 will, in the subsequent vehicle distribution determination, enter a time limited standstill condition. The value also indicates the duration $t_w$, of the standstill condition. Such a standstill condition may be effected by the vehicle waiting for said duration $t_w$. Such waiting may be done in the waiting area wp3. In this example, the selected progress control parameter values $t_w$, are 0, 1, 2, 4, 8, 16, and 32 seconds.

Figure 6:
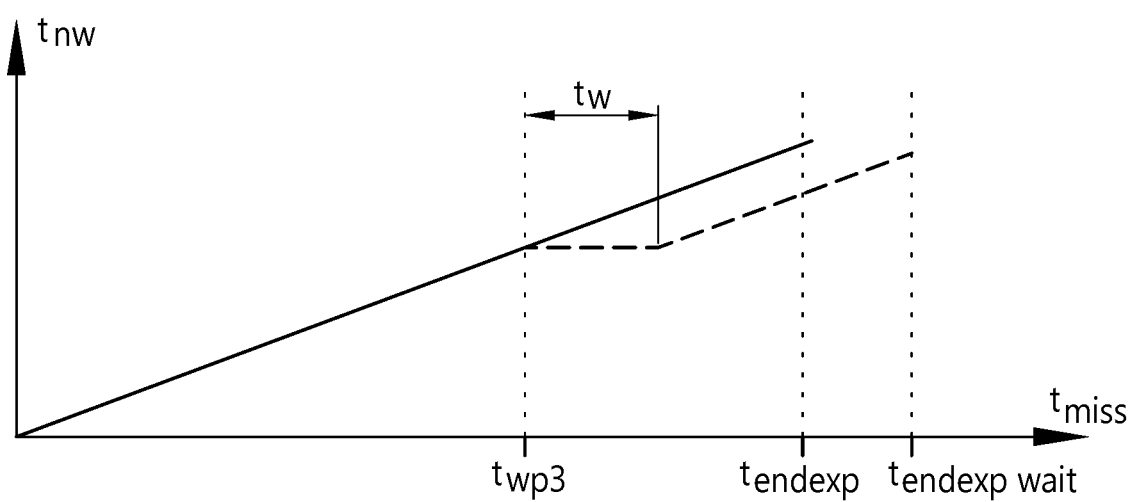
FIG. 6 is a diagram for explaining certain parameters used in the method of FIG. 5.

Reference is made also to FIG. 6, for examples of terms used herein. An active mission time $t_{nw}$ is understood as a time during which the third vehicle V3 is in a mission, and not controlled to wait. The active mission time $t_{nw}$ is equal to an actual mission time $t_{miss}$ if the vehicle is not controlled to wait. A consequence of a control of the third vehicle V3, at a point in time $t_{wp3}$ to wait for a time interval $t_w$ is indicated by the dashed line in FIG. 6. A no wait cycle time $t_{ondoxp}$ is the expected maximum value of the active mission time $t_{nw}$, i.e. the time of a cycle of the third vehicle V3, when the vehicle is not controlled to wait.

Based on the positions of the vehicles V1-V3, a respective distribution of the vehicles is determined S5, for each of the selected progress control parameter values $t_{nw}$, if said third vehicle V3 is controlled based on the respective selected progress control parameter values $t_w$, so that each progress control parameter value $t_w$ is correlated to a respective distribution of the vehicles V1-V3.

Each vehicle distribution is defined as a future state of balance $soB_{fut}$. The respective distribution may be a vector with values that may represent gaps between pars of vehicles. Each distribution may be into a scalar value, in the form of the respective state of balance. In this example, the future state of balance is defined as follows:

$$SoB_{fut}=SoB(t+t_w)=\max(gap(t+t_w))-\min+(gap(t_w)) \qquad (7)$$

where gap is a vector with elements defined as $$gap_i(t+t_w) = \qquad (8)$$

$$\begin{cases} |t_{nwsi+1}(t+t_w) - t_{nswi}(t+t_w)| & (t_{mwsi}(t+t_w) \neq \max(t_{nws})) \\ t_{endexp} - t_{mwsi}(t+t_w) + \min(t_{mws}) & (t_{mwsi}(t+t_w) = \max(t_{nws})) \end{cases}$$

where $t_{nws}$ is a sorted vector, with an ascending order, including the active mission times $t_{nw}$ of the vehicles V1-V3.

Thus, determining a distribution SoBfut of the vehicles V1-V3, may comprise determining the distribution of the vehicles, if the plurality of the vehicles is controlled based on the selected progress control parameter values $t_w$, from a first point in time t to the future point in time t+$t_w$. As indicated above, one of the selected progress control parameter values $t_w$ is zero, 0, and therefore, the distribution of the vehicles, based on this progress control parameter value, is the vehicle distribution at the first point in time, or the present time.

Thereby, a plurality of progress control parameter values are obtained, each correlated to a respective distribution SoBfut of the vehicles, at the future point in time t+$t_w$. The distributions SoBfut, to which the progress control parameter values are correlated, are compared to each other, while taking the respective standstill time under consideration. More specifically, the method comprises identifying S601 a progress control parameter value for controlling the third vehicle V3. This progress control parameter value is identified based partly on the comparison of the distributions, and partly on the respective standstill time interval for the third vehicle V3.

More specifically, a progress control parameter value is identified, which minimises a function which is dependent on the deviation from the desired distribution, and the standstill time. By minimising said function, a balance is provided between moving towards the desired distribution of the vehicles, and minimising the loss of productivity, due to the standstill condition of the third vehicle V3.

In this example, said function to be minimised is as follows:

$$\text{cost}(t_w) = t_w + \varepsilon(u) \quad (9)$$

where $$\varepsilon(u) = SoB_{fut} \cdot ksob \quad (10)$$

An alternative function could be as follows:

$$\text{cost}(t_w) = t_w + \varepsilon(SoB_{nw}) \cdot SoB_{fut}(t_w) \cdot ksob \quad (11)$$

where $$\varepsilon(SoB_{nw}) = \begin{cases} 0 & (|SoB_{nw} - SoB_{tar}| < SoB_{devmax}) \\ 1 & (\text{else}) \end{cases} \quad (12)$$

where SoBtar is a desired state of balance, SoBdevmax is a limit for the state of balance, below which the vehicle is not controlled to wait, and $$SoB_{nw} = SoB(t_w = 0) \quad (13)$$

It follows from these functions that the third vehicle V3 shall be controlled to wait a relatively short time, or to not wait at all, where the state of balance is relatively close to the desired state of balance. However, the third vehicle V3 may be controlled to wait a relatively long time, where the state of balance is relatively far from the desired state of balance.

The third vehicle is then controlled S7 according to the identified progress control parameter value.

Figure 7:
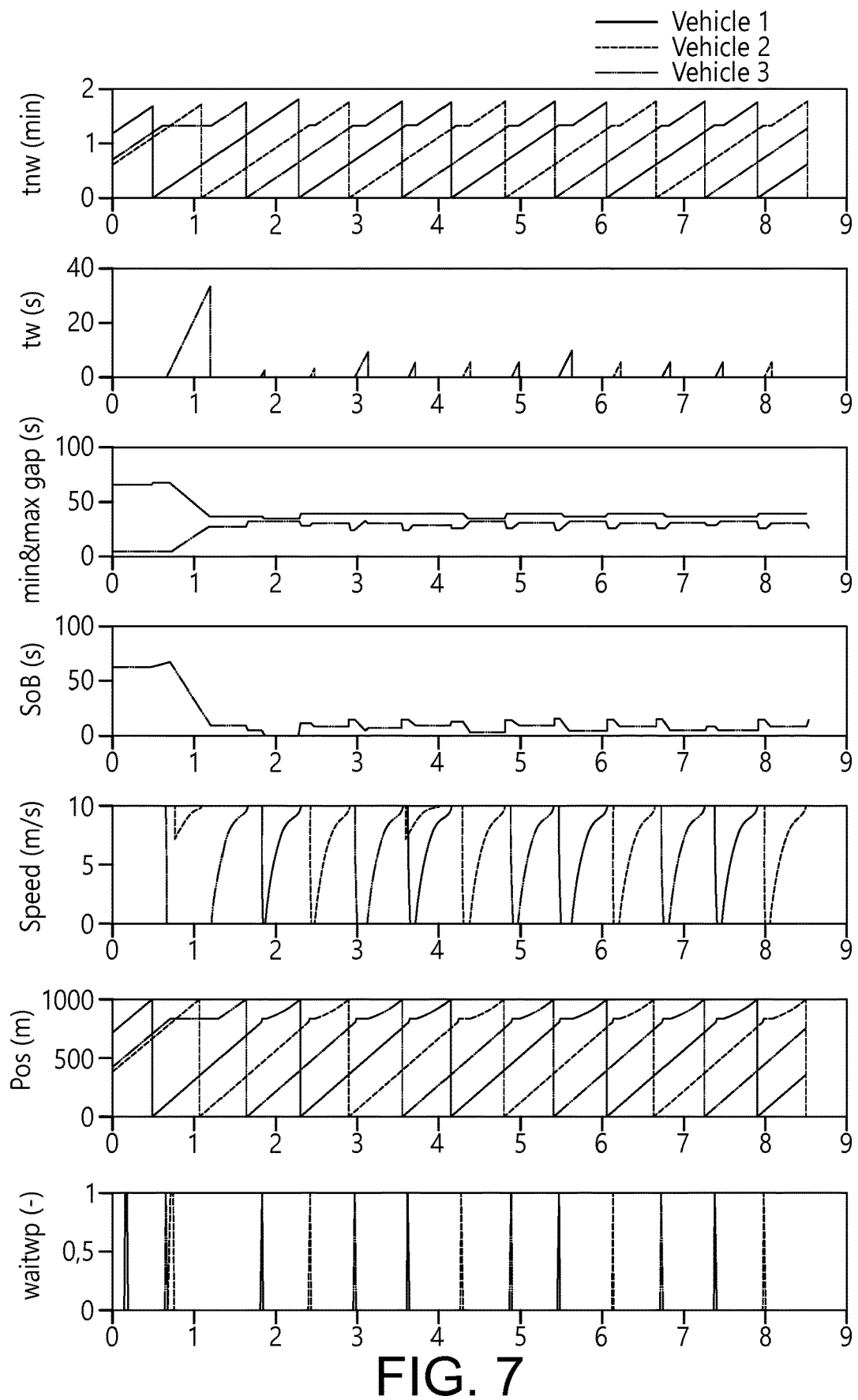
FIG. 7 shows diagrams of parameters, as functions of time, in a simulation, using the method described with reference to FIG. 5 and FIG. 6.

Reference is made to FIG. 7. The plots in this figure depict parameters in a simulation done by one of the inventors, using the method described with reference to FIG. 5 and FIG. 6. The simulation includes three vehicles. As can be seen, initially the distribution between vehicles is poorly balanced. After approximately 5 minutes a reasonably good balance is achieved. In this example, the selected progress control parameter values $t_w$, i.e. the standstill time intervals, are the same as in the example above, i.e. 0, 1, 2, 4, 8, 16, and 32 seconds.

It is to be understood that the present invention is not limited to the embodiments described above and illustrated in the drawings; rather, the skilled person will recognize that many changes and modifications may be made within the scope of the appended claims.

The invention claimed is:

1. A method for controlling vehicles in a mission along a route by a control unit arranged to communicate wirelessly with each of the vehicles, comprising:
determining, by the control unit, a desired distribution indicative of gaps between two successive vehicles along the route,
selecting, by the control unit, at least two progress control value sets, each value set comprising a respective value of a progress control parameter for at least one of the vehicles, wherein each progress control parameter value influences the rate of progress of the respective vehicle,
determining, by the control unit, for each of the selected progress control value sets, a respective distribution of the vehicles, if the at least one of the vehicles is controlled based on the respective selected progress control value set, so that each progress control value set is correlated to a respective distribution of the vehicles, wherein at least one of the determined distributions is at a future point in time,
identifying, by the control unit, from the selected progress control value sets, the respective distribution which presents the smallest deviation from the desired distribution, and identifying the progress control value set for controlling the at least one of the vehicles, which corresponds to the identified distribution, and
controlling the at least one of the vehicles according to the identified progress control value set, wherein the at least one of the vehicles is controlled based on at least one of the selected progress control value sets, from a first point in time to the future point in time.

2. The method according to claim 1, wherein selecting at least two progress control value sets, and determining, for each of the selected progress control value sets, a respective distribution of the vehicles, comprises selecting a progress control value set, determining a distribution of the vehicles, wherein the at least one of the vehicles is controlled based on the selected progress control value set, and repeating once, or a plurality of times, the progress control value set selection and the vehicle distribution determination.

3. The method according to claim 1, wherein the progress control value sets are speed value sets, each speed value set comprising a respective speed value for at least one of the vehicles, wherein each speed value set is a control vector indicating, for each vehicle, a condition with no speed change, a condition with a positive speed change, or a condition with a negative speed change.

4. The method according to claim 3, wherein each speed value set comprises a respective speed value for all of the vehicles.

5. The method according to claim 1, wherein in each progress control value set, each progress control parameter value represents a time interval value for a standstill condition of the respective vehicle.

6. The method according to claim 5, wherein the method is carried out upon one of the at least one vehicle approaching a designated waiting area along the route.

7. The method according to claim 5, wherein identifying a progress control value set for controlling at least one of the vehicles, comprises identifying, from the selected progress control value sets, a progress control value set based partly on the respective standstill time interval for the at least one vehicle.

8. The method according to claim 5, wherein identifying a progress control value set for controlling at least one of the vehicles, comprises identifying a progress control value set which minimizes a function which is a linear combination of the deviation from the desired distribution and the standstill time.

9. The method according to claim 5, wherein one of the progress control value sets includes a progress control parameter value representing a zero standstill time interval of the respective vehicle, and the remaining at least one progress control value set each includes a progress control parameter value representing a standstill condition during a respective predetermined time interval.

10. The method according to claim 9, wherein three or more progress control value sets are selected, wherein, in the remaining at least two progress control value sets, the time intervals are different from one progress control value set to another.

11. The method according to claim 1, wherein the desired distribution indicative of gaps between two successive vehicles along the route is a distribution where the gaps between any two successive vehicles along the route are equal.

12. The method according to claim 1, wherein determining a respective distribution of the vehicles comprises determining a respective state of balance indicating, as a function of the respective progress control value set, a respective deviation of the vehicles, from the desired distribution.

13. The method according to claim 1, wherein the mission is a circulating mission.

14. The method according to claim 1, further comprising repeating after a predetermined time interval the steps of selecting progress control value sets, determining a respective vehicle distribution, identifying a progress control value set for controlling the at least one of the vehicles, and controlling the at least one of the vehicles according to the identified progress control value set.

15. A non-transitory computer readable medium carrying a computer program comprising program code means for performing the steps of claim 1 when said program product is run on a computer, or a group of computers.

16. A control unit, or a group of control units, configured to perform the steps of the method according to claim 1.

17. A vehicle comprising a control unit according to claim 16.

\* \* \* \* \*